United States Patent
Kurashima

(10) Patent No.: US 8,588,390 B2
(45) Date of Patent: Nov. 19, 2013

(54) TELEPHONE CONVERSATION RELAY SERVER, VOICE TELEPHONE CONVERSATION SYSTEM, AND VOICE TELEPHONE CONVERSATION RELAY METHOD

(75) Inventor: Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 504 days.

(21) Appl. No.: 12/919,549

(22) PCT Filed: Feb. 27, 2009

(86) PCT No.: PCT/JP2009/053734
§ 371 (c)(1),
(2), (4) Date: Aug. 26, 2010

(87) PCT Pub. No.: WO2009/107800
PCT Pub. Date: Sep. 3, 2009

(65) Prior Publication Data
US 2011/0007886 A1    Jan. 13, 2011

(30) Foreign Application Priority Data

Feb. 27, 2008  (JP) ................. 2008-045363

(51) Int. Cl.
*H04M 3/54* (2006.01)
*H04M 3/58* (2006.01)
(52) U.S. Cl.
USPC ............ 379/201.02; 379/211.02; 379/212.01; 455/417
(58) Field of Classification Search
USPC ............. 379/201.01, 201.02, 211.01–212.01; 455/414.1, 417
See application file for complete search history.

(56) References Cited

U.S. PATENT DOCUMENTS

| | | | |
|---|---|---|---|
| 7,149,532 B2 * | 12/2006 | Akama | 455/456.2 |
| 8,442,195 B2 * | 5/2013 | Wang | 379/201.02 |
| 2007/0054687 A1 * | 3/2007 | Akita et al. | 455/518 |
| 2007/0127677 A1 * | 6/2007 | Shima et al. | 379/211.02 |
| 2007/0218879 A1 * | 9/2007 | Houmura et al. | 455/414.1 |

FOREIGN PATENT DOCUMENTS

| | | |
|---|---|---|
| JP | 9-233550 A | 9/1997 |
| JP | 2003078934 A | 3/2003 |
| JP | 2003219445 A | 7/2003 |
| JP | 2004343440 A | 12/2004 |
| JP | 2007013615 A | 1/2007 |
| JP | 3904091 B | 4/2007 |
| JP | 2007180838 A | 7/2007 |
| JP | 2007208446 A | 8/2007 |
| WO | 2005009007 A | 1/2005 |

OTHER PUBLICATIONS

International Search Report for PCT/JP2009/053734 mailed Mar. 31, 2009.
J. Rosenberg et al., "Best Current Practices for Third Party Call Control (3pcc) in the Session initiation Protocol (SIP)", Network Working Group. RFC3725, Apr. 2004.
A. Johnson, Ed., "SIP Service Examples", draft-ietf-sipping-service-examples-11, Internet-Draft, IETF, Oct. 2006, pp. 35-43.

* cited by examiner

*Primary Examiner* — Harry Hong

(57) ABSTRACT

A call relay server comprises a usage status management unit that, when a user starts using a system from a main terminal and the notification is received from the main terminal and if a sub terminal related to the main terminal is registered, confirms the user via the main terminal whether to delete the registration of the sub terminal and, if a deletion instruction is received, deletes the registration of the sub terminal.

8 Claims, 19 Drawing Sheets

FIG. 3

| USER TERMINAL INFORMATION | | | | |
|---|---|---|---|---|
| PROXY NUMBER | MAIN TERMINAL ID | MAIN TERMINAL PHONE NUMBER | SUB TERMINAL ID | SUB TERMINAL PHONE NUMBER |
| 0501111111 | aaa | 0901111111 | bbb | 0902222222 |
| 0501111112 | ccc | 0901111112 | | |
| 0501111113 | ddd | 0901111113 | eee | 0902222223 |

FIG. 4

| CALL CONTROL INFORMATION | |
|---|---|
| CALLING SOURCE PHONE NUMBER | REQUESTED PHONE NUMBER |
| 0901111111 | 0311111111 |
| 0901111112 | 0311111112 |
| 0902222223 | 0322222223 |

FIG. 14

| USER TERMINAL INFORMATION | | | | | |
|---|---|---|---|---|---|
| USER ID | PROXY NUMBER | MAIN TERMINAL ID | MAIN TERMINAL PHONE NUMBER | SUB TERMINAL ID | SUB TERMINAL PHONE NUMBER |
| Taro | 0501111111 | aaa | 0901111111 | bbb | 0902222222 |
| Jiro | 0501111112 | ccc | 0901111112 | | |
| Hanako | 0501111113 | ddd | 0901111113 | eee | 0902222223 |

FIG. 15

| USER TERMINAL INFORMATION | | |
|---|---|---|
| PROXY NUMBER | MAIN TERMINAL ID | SUB TERMINAL ID |
| 0501111111 | aaa | bbb |
| 0501111112 | ccc | |
| 0501111113 | ddd | eee |

FIG. 16

| PHONE TERMINAL INFORMATION | |
|---|---|
| TERMINAL ID | PHONE NUMBER |
| aaa | 09011111111 |
| bbb | 09022222222 |
| ccc | 09011111112 |
| ddd | 09011111113 |
| eee | 09022222223 |

FIG. 17

| USER TERMINAL INFORMATION | | | |
|---|---|---|---|
| USER ID | PROXY NUMBER | MAIN TERMINAL ID | SUB TERMINAL ID |
| Taro | 0501111111 | aaa | bbb |
| Jiro | 0501111112 | ccc | |
| Hanako | 0501111113 | ddd | eee |

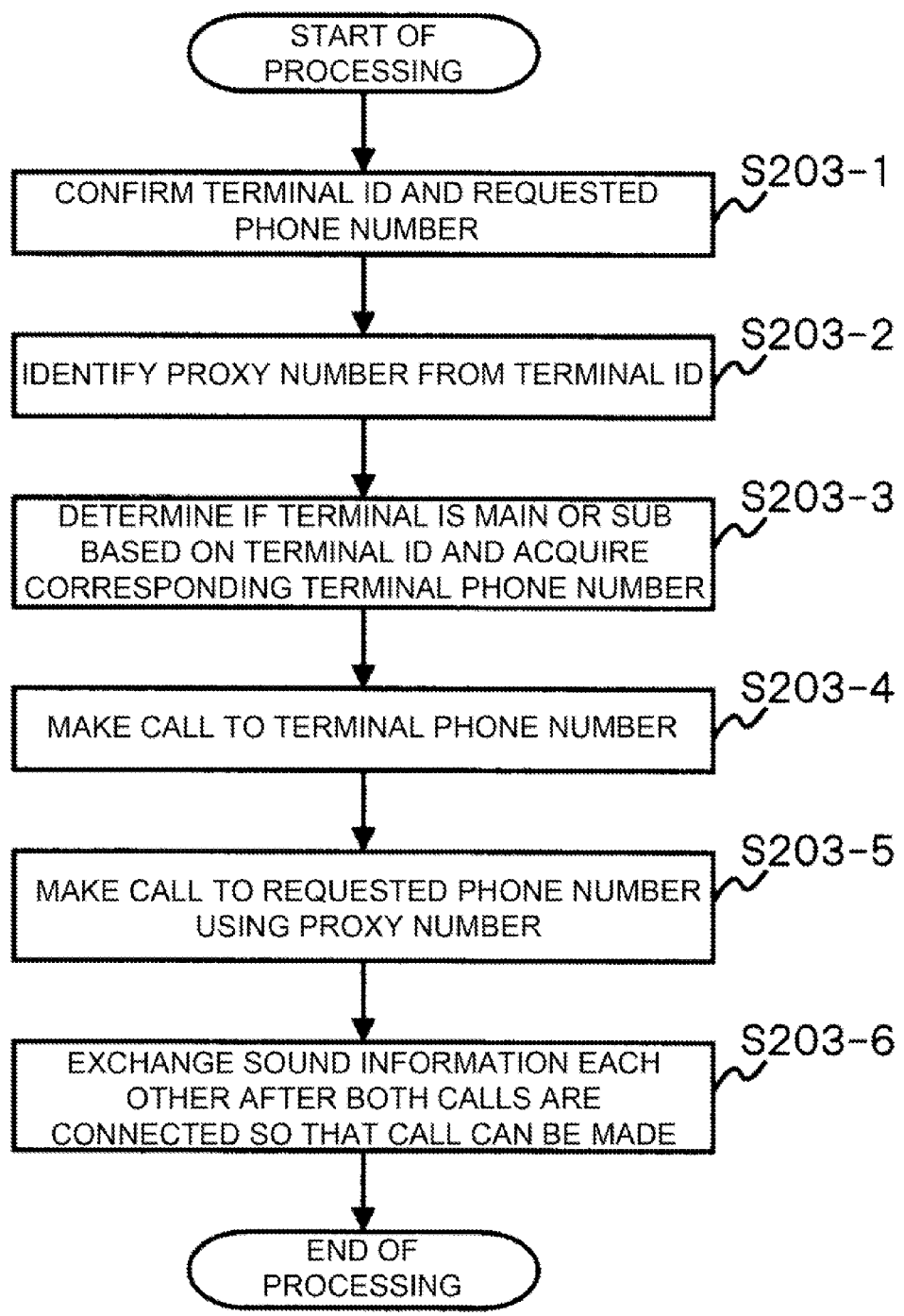

TELEPHONE CONVERSATION RELAY SERVER, VOICE TELEPHONE CONVERSATION SYSTEM, AND VOICE TELEPHONE CONVERSATION RELAY METHOD

CROSS-REFERENCE TO RELATED APPLICATION

The present invention is the National Phase of PCT/JP2009/053734, filed Feb. 27, 2009, which claims the benefit of Japanese Patent Application 2008-045363, filed on Feb. 27, 2008, which is hereby incorporated by reference herein in its entirety.

TECHNICAL FIELD

The present invention relates to a call relay server, a voice call system, and a voice call relay method, and more particularly to a call relay server, a voice call system, and a voice call relay method that allow a voice call to be made and received while hiding the phone number of a user's phone terminal by another phone number.

BACKGROUND

In the phone system related to the present invention, the calling party phone-number notification service is provided in which the phone number of the phone terminal A of the calling party is notified to the phone terminal B of the called party. However, when it is desired not to show the actual phone number of the calling party phone terminal A on the called party, one possible solution is to notify another phone number to the called party's phone terminal B as the phone number of the calling party.

In the description below, another phone number used in place of the actual phone number of the calling party phone terminal A is called a "proxy phone number."

One possible way to change the phone number of the calling party phone terminal A to a proxy phone number is that a call from the phone terminal A is terminated at the call relay server and, at the same time, the call relay server makes a call to the called party's phone terminal B using a proxy phone number.

Patent Document 1 describes a phone system that allows an external phone terminal to make a call to a desired extension phone terminal. The document shows an example of this system in which the call relay server (call relay device) makes a call to both the phone terminal of the call source and the extension phone terminal of the call destination (see FIG. 22 in Patent Document 1). In this case, it can be easily estimated that the calling party number the call relay server notifies the extension phone terminal is one of the extension phone numbers possessed by the call relay server.

FIG. 2 in Non-Patent Document 1 also shows a phone system of the third party call control type in which the controller, which serves as the call relay server, makes a call to both the calling party and the called party.

In any of the examples described above, when a call is connected from the call relay server to the called party phone terminal B, a proxy phone number corresponding to the calling party phone terminal A is used and, when a call corresponding to the proxy phone number is received as a callback call from the called party phone terminal B, the call relay device forwards the received call to the corresponding phone terminal A. In this way, the phone number of the phone terminal A can be hidden by the proxy phone number.

On the other hand, Patent Document 2 describes an invention that allows one user to have three phones each of which has the common proxy phone number (described as "transformed call originator number" in Patent Document 2).

According to this invention, when a call is made from any of the phones, the same call originator number (transformed call originator number) is displayed on a call destination phone and, when a call is returned from a call destination phone using the call originator number, a phone of the call destination is identified and the call is received by the extension phone that made the call.

[Patent Document 1] JP Patent No. 3904091
[Patent Document 2] Japanese Patent Publication Kokai No. JP-P2003-219445A
[Non-Patent Document 1] RFC3275, "Best Current Practices for Third Party Call Control (3pcc) in the Session Initiation Protocol (SIP)"

SUMMARY

The contents disclosed in Patent Documents 1 and 2 and Non-Patent Document 1 given above are hereby incorporated by reference herein in their entirety. The following analysis is given from the viewpoint of the present invention.

However, the systems described in Patent Document 1 and Non-Patent Document 1 are not compatible with an application scene in which one user has multiple phone terminals temporarily.

For example, assume that the user has a mobile phone and uses the call service, which is based on the proxy phone number service, via a call relay server. And, also assume that the user's mobile phone can be used only domestically.

In such a case, the user who must go abroad on an overseas business trip gets an international roaming mobile phone, but the problem here is that, with this international roaming mobile phone, the user cannot use, for a short period of time, the proxy phone number call service provided on the mobile phone that the user has been used domestically.

To address this problem, it may be attempted that the user may unregister the current terminal (which can be used only domestically) once from the call service and register the international roaming mobile phone with the service.

However, not only is the registration change cumbersome but, when the user returns home, the user is required to perform the cumbersome steps of unregistering the international roaming mobile phone from the service and registering the domestically used mobile phone with the service again, counted as doubled cumbersome operations.

On the other hand, though the invention described in Patent Document 2 allows a common proxy phone number to be assigned to multiple phones, the invention does not provide any function, such as that provided by the present invention, to give callback call reception priority to multiple phones so that a higher-priority phone can receive a return call.

In view of the foregoing, there is a need in the art to provide a call relay server, a voice call system, and a voice call relay method that provide a call service in which one user can use a proxy number on multiple phone terminals temporarily.

In addition, there is a need for managing distinctively a main terminal that is used regularly and a sub terminal that is used temporarily so that, when the sub terminal is registered but the main terminal is used, the user can confirm if the registration of the sub terminal is already deleted to prevent the user from failing to delete the registration of the sub terminal.

A call relay server in a first aspect of the present invention comprises: a call control information storage unit that stores, for each user, a proxy phone number and terminal identification information on a main terminal and a sub terminal; and a call control unit that, when a call start request is received from the main terminal or the sub terminal, judges if the terminal is a main terminal or a sub terminal based on terminal identification information on a request source, establishes a call with the main terminal or the sub terminal and then makes a call to a call destination using the proxy phone number of the user, and forwards an incoming call, addressed to the proxy phone number, to the sub terminal if terminal identification information on the sub terminal is stored but, otherwise, forwards the incoming call to the main terminal.

To solve the problems described above, the call relay server of the present invention may comprise a call control information storage unit that stores, for each user, a proxy phone number and the terminal IDs (Identification) and phone numbers of two phone terminals, main terminal and sub terminal; and a call control unit that, when a call start request is received from the phone terminal, judges if the terminal is a main terminal or a sub terminal based on the terminal ID of the request source, establishes a call with the phone terminal and then makes a call to a call destination using the proxy phone number of the user and, when an incoming call, addressed to the proxy phone number, is received, forwards the incoming call to the sub terminal if information on the sub terminal is stored but, otherwise, forwards the incoming call to the main terminal.

A voice call system in a second aspect of the present invention comprises a plurality of phone terminals; and the call relay server described above for relaying a call among the plurality of phone terminals.

The voice call system of the present invention may comprise a plurality of phone terminals; and a call relay server that relays a call among the phone terminals and that comprises a call control information storage unit that stores, for each user, a proxy phone number, terminal IDs of two phone terminals, main terminal and sub terminal, and phone numbers and a call control unit that, when a call start request is received from the phone terminal, judges if the terminal is a main terminal or a sub terminal based on the terminal ID of the request source, establishes a call with the phone terminal and then makes a call to a call destination using the proxy phone number of the user and, when an incoming call, addressed to the proxy phone number, is received, forwards the incoming call to the sub terminal if information on the sub terminal is stored but, otherwise, forwards the incoming call to the main terminal.

A voice call relay method in a third aspect of the present invention comprises the steps of, performed by a call relay server, of storing, for each user, a proxy phone number and terminal identification information on a main terminal and a sub terminal; when a call start request is received from the main terminal or the sub terminal, judging if the terminal is a main terminal or a sub terminal based on terminal identification information on a request source, establishing a call with the main terminal or the sub terminal and then making a call to a call destination using the proxy phone number of the user; and forwarding an incoming call, addressed to the proxy phone number, to the sub terminal if terminal identification information on the sub terminal is stored hut, otherwise, forwarding the incoming call to the main terminal.

The voice call relay method of the present invention is a method for use where there are a call relay server that stores, for each user, a proxy phone number and the terminal IDs and phone numbers of two phone terminals, main terminal and sub terminal, and phone terminals. The call relay server may include a step, performed when the call relay server receives a call start request from the phone terminal, for judging if the terminal is a main terminal or a sub terminal based on the terminal ID of the request source, establishing a call with the phone terminal, and then making a call to a call destination using the proxy phone number of the user; and a step, performed when the call relay server receives an incoming call addressed to the proxy phone number, for forwarding the incoming call to the sub terminal if terminal information on the sub terminal is stored but, otherwise, forwarding the incoming call to the main terminal.

A program in a fourth aspect of the present invention is a program causing a computer, installed in a call relay server, to perform the processing of the steps of the voice call relay method described above.

A call relay server in a first mode comprises a usage state management unit that, when a user starts using a system from a main terminal and a notification of starting is received from the main terminal and if a sub terminal related to the main terminal is registered, confirms the user via the main terminal whether to delete the registration of the sub terminal and, if a deletion instruction is received, deletes a registration of the sub terminal.

The call relay server in a second mode is a call relay server, wherein, when the user starts using the system from the main terminal or the sub terminal, the usage state management unit receives a notification of starting along with a proxy phone number from the main terminal or the sub terminal and, if the main terminal or the sub terminal is not registered as a phone terminal of the proxy phone number, confirms the user via the main terminal or the sub terminal whether the main terminal or the sub terminal will be used as a sub terminal of the proxy phone number; and if a request to use the terminal as a sub terminal is received, registers the terminal as a sub terminal.

The call relay server in a third mode further comprises a call control information storage unit that stores, for each user, a proxy phone number and terminal identification information on a main terminal and a sub terminal, wherein the usage state management unit references the call control information storage unit to judge whether the sub terminal related to the main terminal is registered or not.

A voice call system in a fourth mode comprises: a plurality of phone terminals; and the phone relay server in one of first to third modes described above, the phone relay server relaying a call among the plurality of phone terminals.

A voice call relay method in a fifth mode comprises the steps, performed by a call relay server, of: when a user starts using a system from a main terminal, receiving the notification from the main terminal; if a sub terminal related to the main terminal is registered, confirming the user via the main terminal whether to delete the registration of the sub terminal; and if a deletion instruction is received, deleting the registration of the sub terminal. The voice call relay method in a sixth mode further comprises the steps, performed by said call relay server, of: when the user starts using the system from the main terminal or the sub terminal, receiving a notification of starting along with a proxy phone number from the main terminal or the sub terminal; if the main terminal or the sub terminal is not registered as a phone terminal of the proxy phone number, confirming the user via the main terminal or the sub terminal whether the main terminal or the sub terminal will be used as a sub terminal of the proxy phone number; and if a request to use the terminal as a sub terminal is received, registering the terminal as a sub terminal.

The voice call relay method in a seventh mode further comprises the steps, performed by said call relay server, of: storing, for each user, a proxy phone number and terminal identification information on a main terminal and a sub terminal as user terminal information; and referencing the user terminal information to judge whether the sub terminal related to the main terminal is registered or not.

A program in an eighth mode causes a computer to perform processing of the steps of the voice relay method in one of fifth to seventh modes described above.

The present invention provides the following advantage, but not restricted thereto. According to the present invention, one user may use a call service in which a proxy number is used on multiple phone terminals temporarily.

In addition, the present invention manages distinctively a main terminal that is used regularly and a sub terminal that is used temporarily, so that, when the sub terminal is registered but the main terminal is used, the user can confirm if the registration of the sub terminal is already deleted to prevent the user from failing to delete the registration of the sub terminal.

BRIEF DESCRIPTION OF THE DRAWINGS

FIG. 3 is a diagram showing an example of user terminal information.

FIG. 4 is a diagram showing an example of call control information.

FIG. 14 is a diagram showing an example of user terminal information in a fifth exemplary embodiment.

FIG. 15 is a diagram showing an example of user terminal information in the fifth exemplary embodiment.

FIG. 16 is a diagram showing an example of phone terminal information in the fifth exemplary embodiment.

FIG. 17 is a diagram showing another example of user terminal information in the fifth exemplary embodiment.

FIG. 19 is a flowchart showing an operation of call processing in the sixth exemplary embodiment.

Explanations of symbols are given in the following description.

PREFERRED MODES

Figure 1:
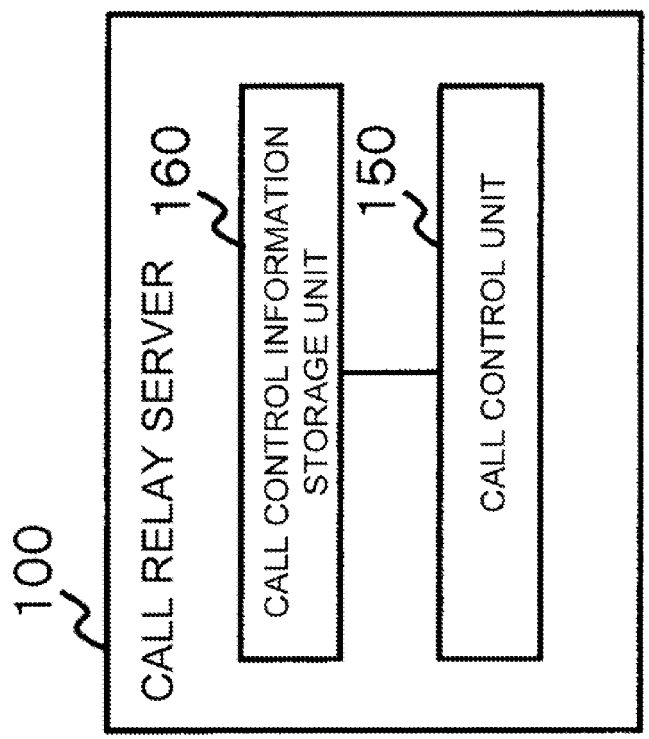
FIG. 1 is a diagram showing a basic structure of a call relay server.

Before going into the description of exemplary embodiments, an operation of the present invention will be described briefly. FIG. 1 is a diagram showing a structure of a call relay server according to the present invention.

Referring to the figure, a call relay server 100 of the present invention comprises a call control information storage unit 160 that stores, for each user, the proxy phone number and the terminal IDs (Identifications) and the phone numbers of two phone terminals, main terminal and sub terminal.

In addition, the call relay server 100 of the present invention further comprises a call control unit 150 that, when a call initiation request is received from a phone terminal, checks the terminal ID of the requesting terminal if the terminal is a main terminal or a sub terminal, establishes a call with the phone terminal, and makes a call to the call destination using the proxy phone number of the user and at the same time, when an incoming call to the proxy phone number is received, forwards the call to the sub terminal if the sub terminal information is stored or to the main terminal if not.

As described above, the present invention makes available two terminals, main and sub, with priority given to call reception by a sub terminal than call reception by a main terminal. This eliminates the need to set the selection of the call reception destination in an application scene where the user must use a terminal temporarily.

Next, exemplary embodiments will be described in more detail with reference to the drawings.

First Exemplary Embodiment

Figure 2:
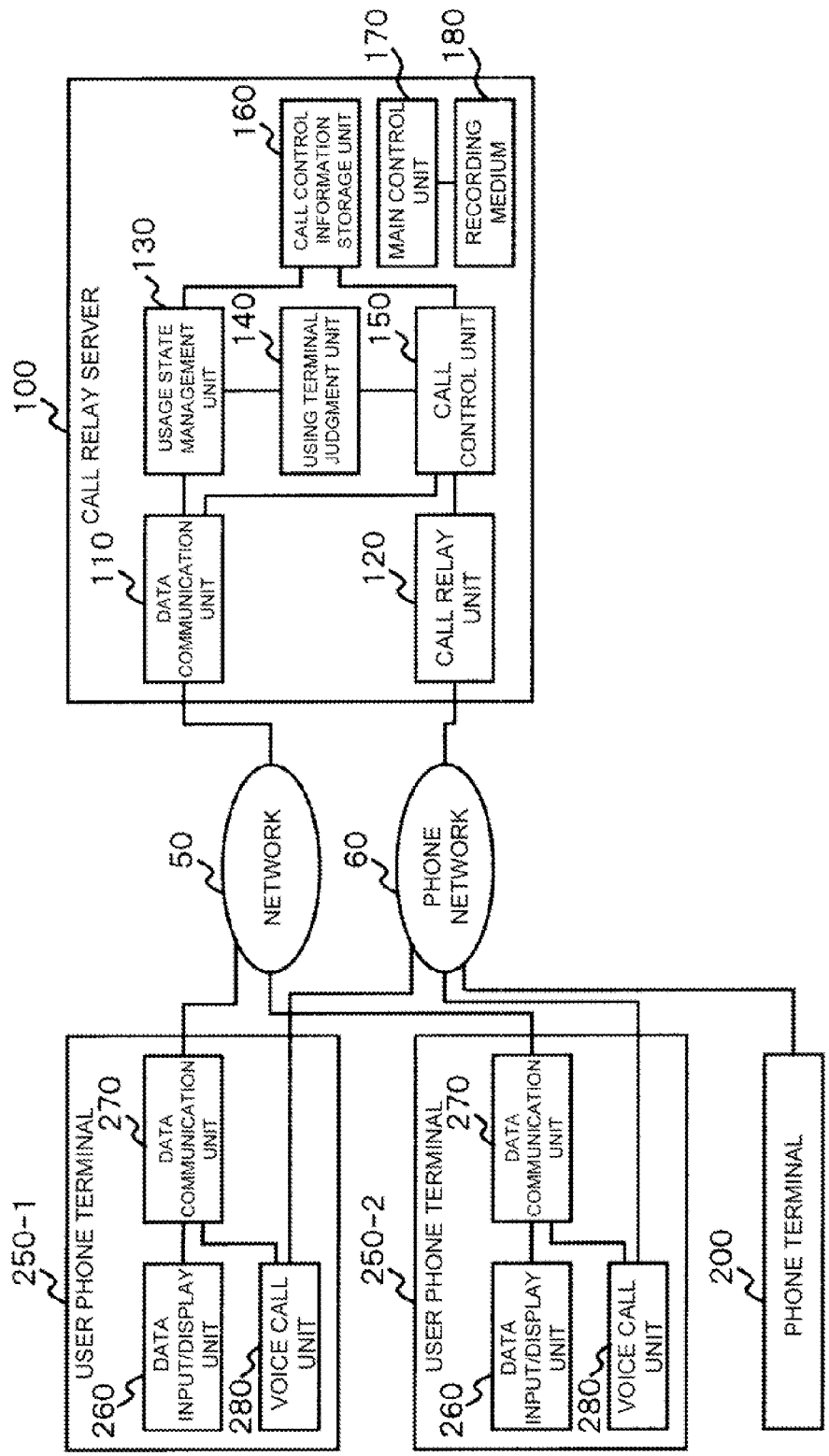
FIG. 2 is a block diagram showing a main structure of a voice call system in a first exemplary embodiment.

First, a first exemplary embodiment will be described. FIG. 2 is a block diagram showing a structure of a voice call system in the first exemplary embodiment.

The system in the first exemplary embodiment comprises a call relay server 100, a phone terminal 200, user phone terminals 250-1 and 250-2, a network 50 that connects the call relay server 100 and the user phone terminals 250-1 and 250-2, and a phone network 60 that connects the call relay server 100, phone terminal 200, and the user phone terminals 250-1 and 250-2.

An example of the network 50 is the Internet. An example of the phone network 60 is a public telephone network such as a public fixed phone network and a public mobile phone network. The network 50 and the phone network 60, though separated in this figure, may be integrated into one; for example, when the phone network 60 is an IP phone network based on the VoIP (Voice Over Internet Protocol) technology, the phone network 60 includes the function of the network 50.

The call relay server 100 comprises a data communication unit 110 that has the function to communicate with the user phone terminals 250-1 and 250-2 via the network 50 and a call relay unit 120 that makes a voice call, or relays a voice call, to and from the phone terminal 200 and the user phone terminals 250-1 and 250-2 via the phone network 60.

The call relay server 100 further comprises: a usage state management unit 130 that confirms and updates the usage state of a terminal; a using terminal judgment unit 140 that judges the terminal of the message transmitting source when a processing message is received from the user phone terminals 250-1 and 250-2 via data communication; the call control unit 150 that controls the operation of the call relay unit 120; and the call control information storage unit 160 that stores information necessary for call control.

The call control information storage unit 160 stores phone terminal information and call control information. The call relay server 100 may be implemented by a computer such as a personal computer.

When the call relay server 100 is implemented by a computer, the operation of the data communication unit 110, the call relay unit 120, the usage state management unit 130, the using terminal judgment unit 140, the call control unit 150, and the call control information storage unit 160 may be implemented by the CPU (Central Processing Unit) of the computer that executes the operation according to the computer program. A part having a performance problem may also be implemented by special hardware that is connected with another part via the interface.

FIG. 2 shows an example of the configuration in which the call relay server 100 further comprises a main control unit 170 and a recording medium 180.

The recording medium 180 stores the program of the voice call relay method that will be described later. The main control unit 170 reads the program from the recording medium 180 and controls the data communication unit 110, the call relay unit 120, the usage state management unit 130, the using terminal judgment unit 140, the call control unit 150, and the call control information storage unit 160 according to the program.

The phone terminal 200 may be a wired phone terminal (fixed phone terminal) or a mobile phone terminal.

The user phone terminals 250-1 and 250-2 are one type of phone terminal 200. Each of the user phone terminals 250-1 and 250-2 comprises a data input/display unit 260 that displays information to, and receives input from, the user, a data communication unit 270 that communicates with the call relay server via the network 50, and a voice call unit 280 that makes a voice call via the phone network 60.

The following describes user terminal information stored in the call control information storage unit 160 of the call relay server 100.

The user terminal information includes a proxy phone number that is used in place of the phone number of a user phone terminal (user phone terminals 250-1 and 250-2) when a call is made from the user's phone terminal and that is unique for each user, the information on the main terminal that is a phone terminal primarily used by the user (terminal identification information), and the information on the sub terminal that is a terminal temporarily used (terminal identification information). For each phone terminal, the terminal identification information may include two types of information, that is, the phone number of the phone terminal and the terminal ID notified from the phone terminal at data communication time. In this case, the user terminal information includes a total of five items. Note that the sub terminal column may be blank.

FIG. 3 is a diagram showing an example of the user terminal information. The user terminal information is stored in advance in the call control information storage unit 160 by the administrator of the call relay server 100. The usage state management unit 130 may update the contents of the call control information storage unit 160 in response to a request from the user.

When the terminal ID and the phone number match, they may be combined into one entry, resulting in the following three entries: proxy phone number, main terminal phone number (also terminal ID), and sub terminal phone number (also terminal ID).

Next, the following describes call control information stored in the call control information storage unit 160. This call control information includes the information on the correspondence between the user phone terminal 250-1 or 250-2 and the phone terminal 200 that are communicating with each other, or are going to start communication, using the call service that uses a proxy phone number.

FIG. 4 is a diagram showing an example of call control information. In this example, the respective phone numbers are used to represent the information showing the user phone terminal 250-1 or 250-2 and the phone terminal 200 that are going to start communication. This information may be blank when the call relay server 100 is initially started and is updated by the call control unit 150.

Figure 5:
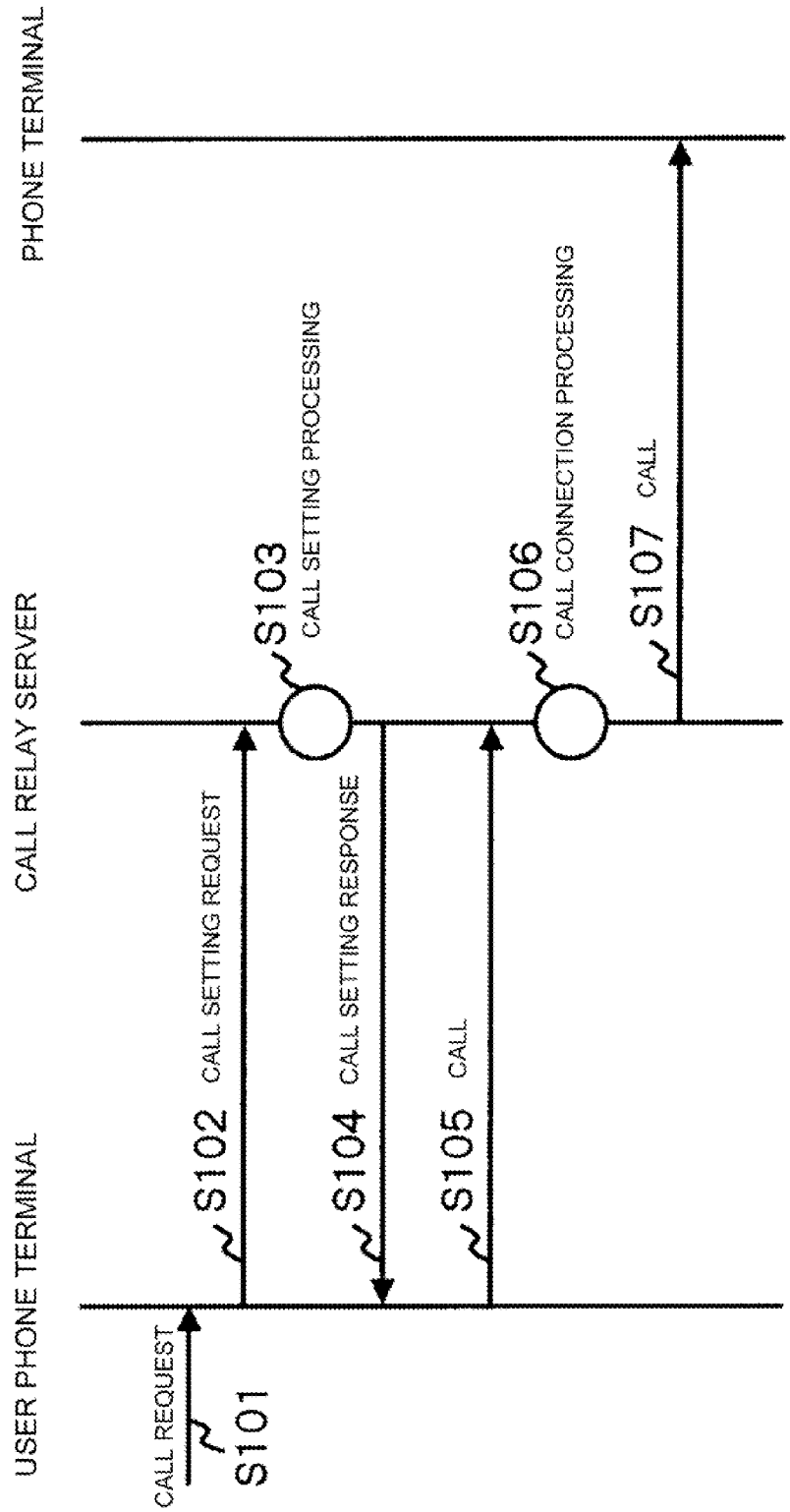
FIG. 5 is a sequence chart showing an operation of call processing in the first exemplary embodiment.
Figure 6:
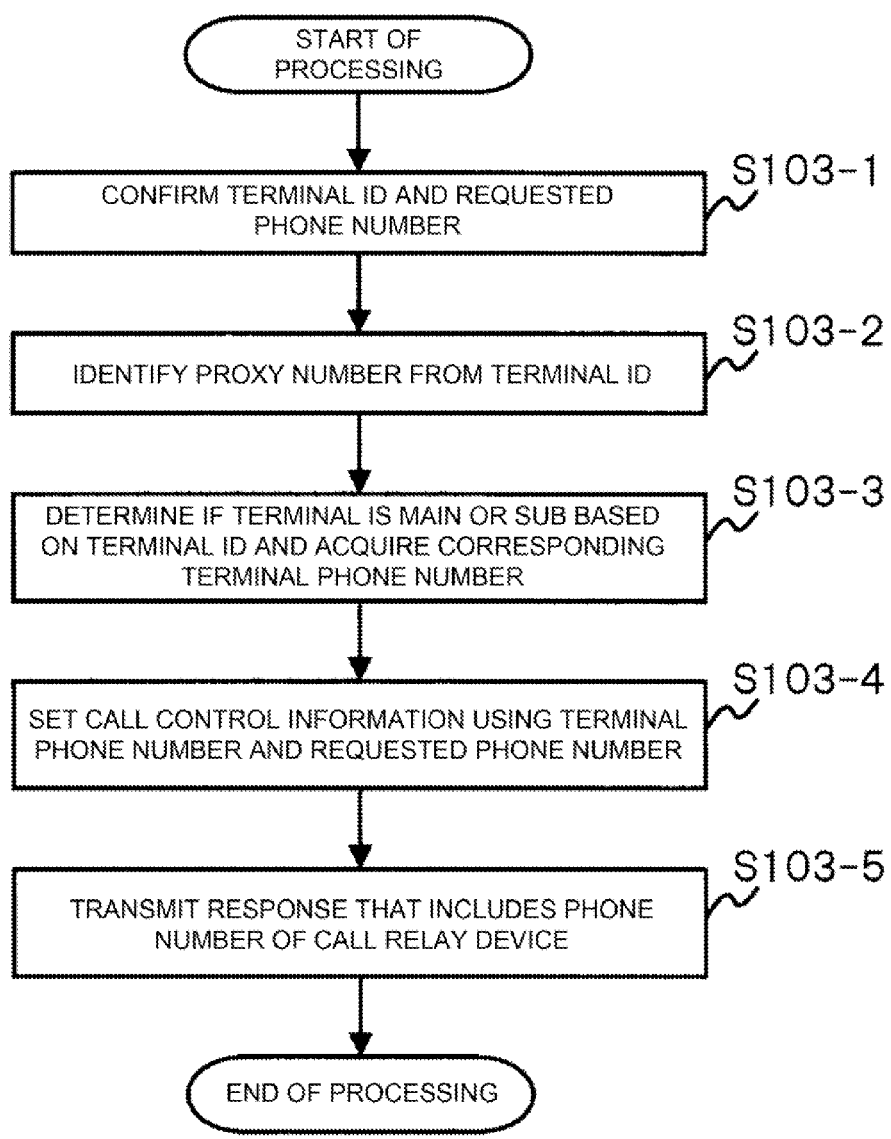
FIG. 6 is a flowchart showing an operation of call processing in the first exemplary embodiment.
Figure 7:
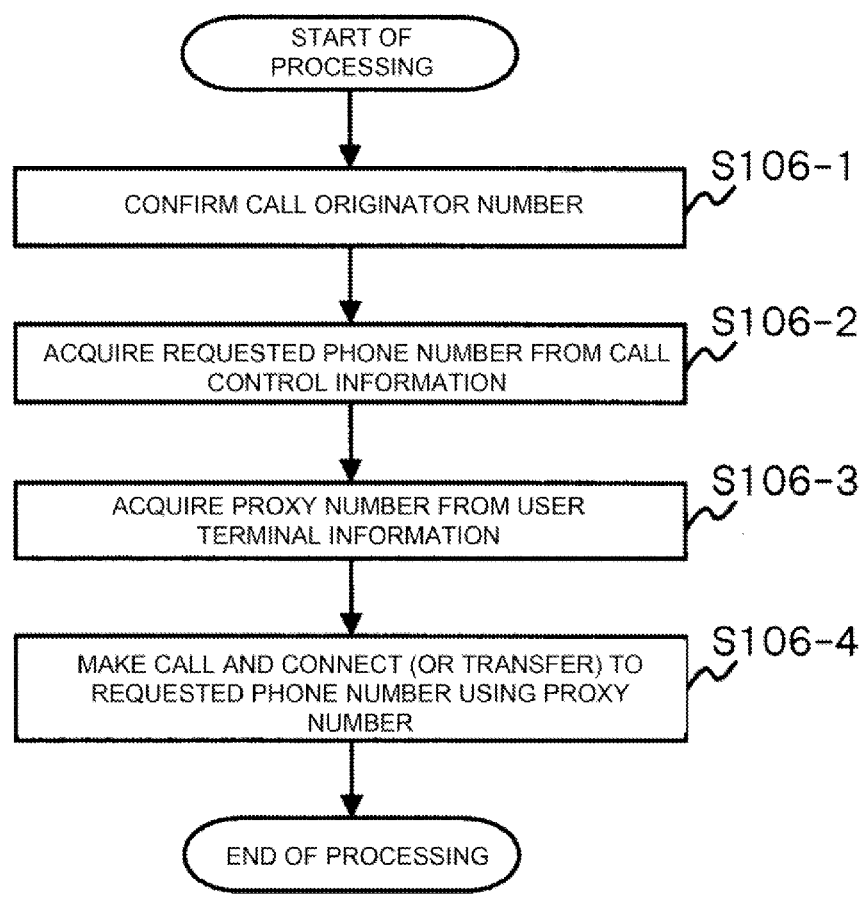
FIG. 7 is a flowchart showing an operation of call processing in the first exemplary embodiment.

Next, the following describes the operation of a voice call system in a first exemplary embodiment with reference to FIG. 5 to FIG. 9. Referring to FIG. 5, FIG. 6, and FIG. 7, the following shows an example of operation in which the user makes a call from the user phone terminal 250-1 or 250-2 to the phone terminal 200 using the voice call system.

FIG. 5 is a sequence chart showing an operation of the call processing in the first exemplary embodiment, and FIG. 6 and FIG. 7 are flowcharts showing the operation of the call processing in the first exemplary embodiment.

First, the user on the user phone terminal 250-1 or 250-2 requests a call via the user interface, such as dial keys, of the data input/display unit 260 of the user phone terminal 250-1 or 250-2 with a phone number specified (step S101 in FIG. 5). In the description below, the phone number specified by the user in this step is called a "requested phone number."

This request is transmitted from the data communication unit 270 of the user phone terminal 250-1 or 250-2 to the data communication unit 110 of the call relay server 100 via the network 50 and then to the call control unit 150 (step S102 in FIG. 5).

Upon receiving this request, the call control unit 150 of the call relay server 100 performs the call setting processing (step S103 in FIG. 5). The following describes a detailed operation of this call setting processing with reference to FIG. 6.

When the call processing is started, the call control unit 150 first confirms the terminal ID and the requested phone number (step S103-1 in FIG. 6). For example, assume that the terminal ID is "aaa" and that the requested phone number is "031111111."

Next, the call control unit 150 requests the using terminal judgment unit 140 to confirm the proxy phone number from the terminal ID, based on the user terminal information stored in the call control information storage unit 160, to acquire the proxy phone number (S103-2 in FIG. 6).

Because the terminal ID is "aaa" in the example described above, the using terminal judgment unit 140 confirms the user terminal information to find an entry whose main terminal ID or the sub terminal ID is "aaa." In this example, the using terminal judgment unit 140 finds an entry whose main terminal ID is "aaa," indicating that the corresponding proxy number is "050111111."

Next, the call control unit 150 requests the using terminal judgment unit 140 to confirm the phone number of the terminal (terminal phone number) from the terminal ID, based on the user terminal information stored in the call control information storage unit 160, to acquire the terminal phone number (S103-3 in FIG. 6).

The using terminal judgment unit 140 references the user terminal information and, if the specified terminal ID matches a main terminal ID, returns the main terminal phone number of the entry as the answer and, if the specified terminal ID matches a sub terminal ID, returns the sub terminal phone number of the entry as the answer.

In this example, because the terminal ID is "aaa," the using terminal judgment unit 140 returns the main terminal phone number "090111111" of the entry, whose main terminal ID is "aaa," as the response.

Next, the call control unit 150 updates the call control information, stored in the call control information storage unit 160, based on the confirmed terminal phone number and the requested phone number. In this example, an entry is created in which the terminal phone number "090111111" is the calling source phone number and the requested phone number is "031111111."

Because a calling source phone number included in the call control information must be unique, an entry whose calling source phone number is "090111111" that is the same as the calling source phone number of a new entry, if already included, is deleted and the new entry is registered.

At the end of the call setting processing, the call control unit 150 transmits a response, which includes the phone number of the call relay server 100, to the user phone terminal 250-1 or 250-2 (step S103-5 in FIG. 6 and step S104 in FIG. 5).

Returning to FIG. 5, the following describes the operation that will, be performed thereafter. Upon receiving the response from the call relay server 100 via the data communication unit 270, the user phone terminal 250-1 or 250-2 passes the data to the voice call unit 280 to cause it to make a call to the phone number of the call relay server 100 included in the response.

When the voice call unit 280, which has received the data, makes a call to the call relay server 100, the call relay unit 120 of the call relay server 100 receives the call (step S105 in FIG. 5).

When the call relay unit 120 of the call relay server 100 receives the call, the call control unit 150 executes the call connection processing (step S106 in FIG. 5). The following describes this call connection processing with reference to FIG. 7.

When the call connection processing is started, the call control unit 150 first confirms the call originator number of the accepted call (step S106-1 in FIG. 7). Because the user phone terminal 250-1 or 250-2, which has the phone number "090111111," makes a call in this example, the confirmed call originator number is "090111111."

Next, the call control unit 150 confirms the call control information stored in the call control information storage unit 160, searches for an entry whose calling source phone number is the confirmed call originator number, and acquires the requested phone number corresponding to the calling source phone number (step S106-2 in FIG. 7).

In this example, because the call originator number is "090111111," "031111111" is acquired as the requested phone number in the example in FIG. 4.

Next, the call control unit 150 confirms the user terminal information, stored in the call control information storage unit 160, via the using terminal judgment unit and acquires the proxy number (step S106-3 in FIG. 7).

In this example, as a result of the search for an entry whose terminal phone number (main terminal phone number or sub terminal phone number) is the call originator number "090111111", the call control unit 150 finds a matching main terminal phone number and acquires "050111111" as the proxy number.

After that, the call control unit 150 instructs the call relay unit 120 to make a call to the requested phone number using the proxy phone number and connect to the requested phone number (step S106-4 in FIG. 7).

In response to this instruction, the call relay unit 120 makes a call to the phone terminal 200, which has the requested phone number, using the proxy phone number and, when the call is connected, exchanges sound information with the call from the user phone terminal 250-1 or 250-2 to allow a voice call to be carried out between the user phone terminal 250-1 or 250-2 and the phone terminal 200.

In this example, a call is made to the requested phone number "031111111" using the proxy number "050111111." When the call is established, the call relay unit 120 exchanges the sound information with the call received from the call originator number "090111111" to allow a voice call to be carried out between the user phone terminal 250-1 or 250-2 having the call originator number "090111111" and the phone terminal 200 having the requested phone number "031111111."

The call from the user phone terminal 250-1 or 250-2 may be connected immediately when the call is accepted first (step S105 in FIG. 5) or may be connected after the call, which is made to the phone terminal 200, is connected.

More specifically, in an example where SIP (Session Initiation Protocol) is used, when the "INVITE" message (call) is transmitted from the user phone terminal 250-1 or 250-2 in step S105 in FIG. 5, "200 OK" is returned before the call is made in step S107 in FIG. 5.

After that, it is possible that the sound information, generated after the call relay server 100 transmits the "INVITE" message to the phone terminal 200, is transmitted to the user phone terminal 250-1 or 250-2 and, after "200 OK" is received from the phone terminal 200, the sound information is exchanged between the two calls.

It is also possible that, when the call relay server 100 receives "183 PROCESSING" from the phone terminal 200 after the call is made in step S107 in FIG. 5, "200 OK" is returned to the user phone terminal 250-1 or 250-2, the sound information generated thereafter is transmitted to the user phone terminal 250-1 or 250-2 and, after "200 OK" is received from the phone terminal 200, the sound information is exchanged between the two calls.

It is also possible that, when the call relay server 100 receives "200 OK" from the phone terminal 200 after the call is made in step S107 in FIG. 5, "200 OK" is passed from the call relay server 100 to the user phone terminal 250-1 or 250-2 and, after that, the sound information is exchanged between the two calls.

In addition, in step S106-4 in FIG. 7, the call control unit 150 may instruct the call relay unit 120 to transfer the call, received from the user phone terminal 250-1 or 250-2, to the phone terminal 200 having the requested phone number as a call from the proxy number.

In this case, the call relay unit 120 connects the call from the user phone terminal 250-1 or 250-2, once holds the call, and then transfers it to the requested phone number "031111111" using the proxy number "050111111".

Figure 8:
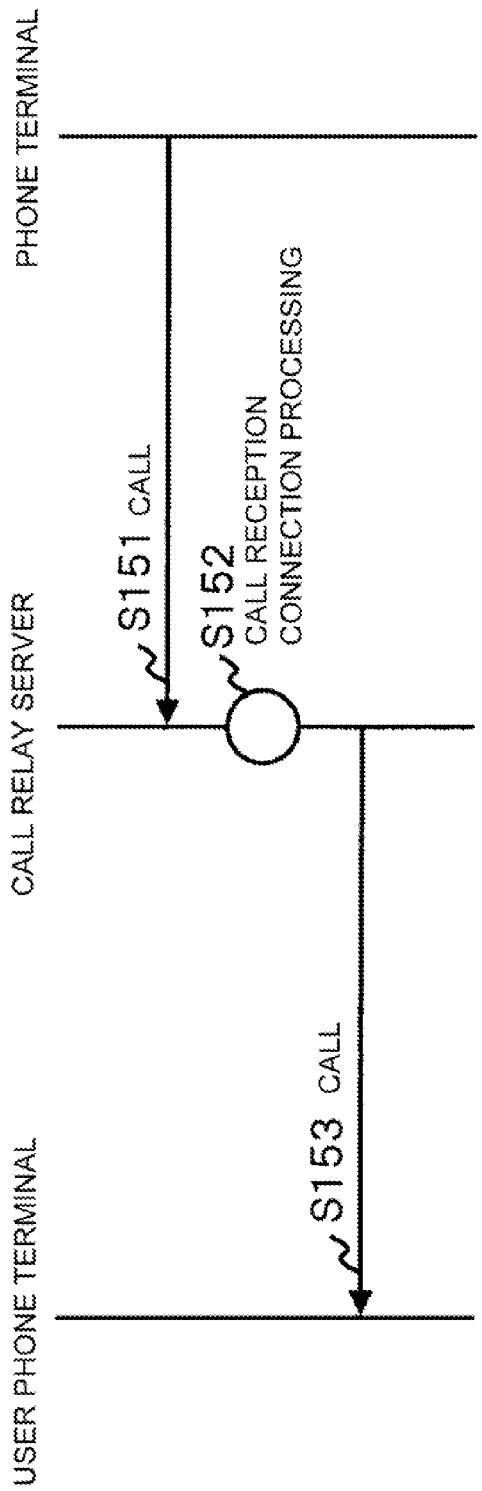
FIG. 8 is a sequence chart showing an operation of call reception processing in the first exemplary embodiment.

Next, the call reception processing will be described. Referring to FIG. 8, the following describes the operation that is performed when a call is made from the phone terminal 200 to the proxy number of the user phone terminal 250-1 or 250-2. FIG. 8 is a sequence chart showing an operation of the reception processing in the first exemplary embodiment.

When the phone terminal 200 makes a call to the proxy phone number, the call reaches the call relay unit 120 of the call relay server 100 because this number is managed by the call relay server 100 (step S151 in FIG. 8).

Then, the call reception connection processing of the call control unit 150 is called from the call relay unit 120 (step S152 in FIG. 8).

Figure 9:
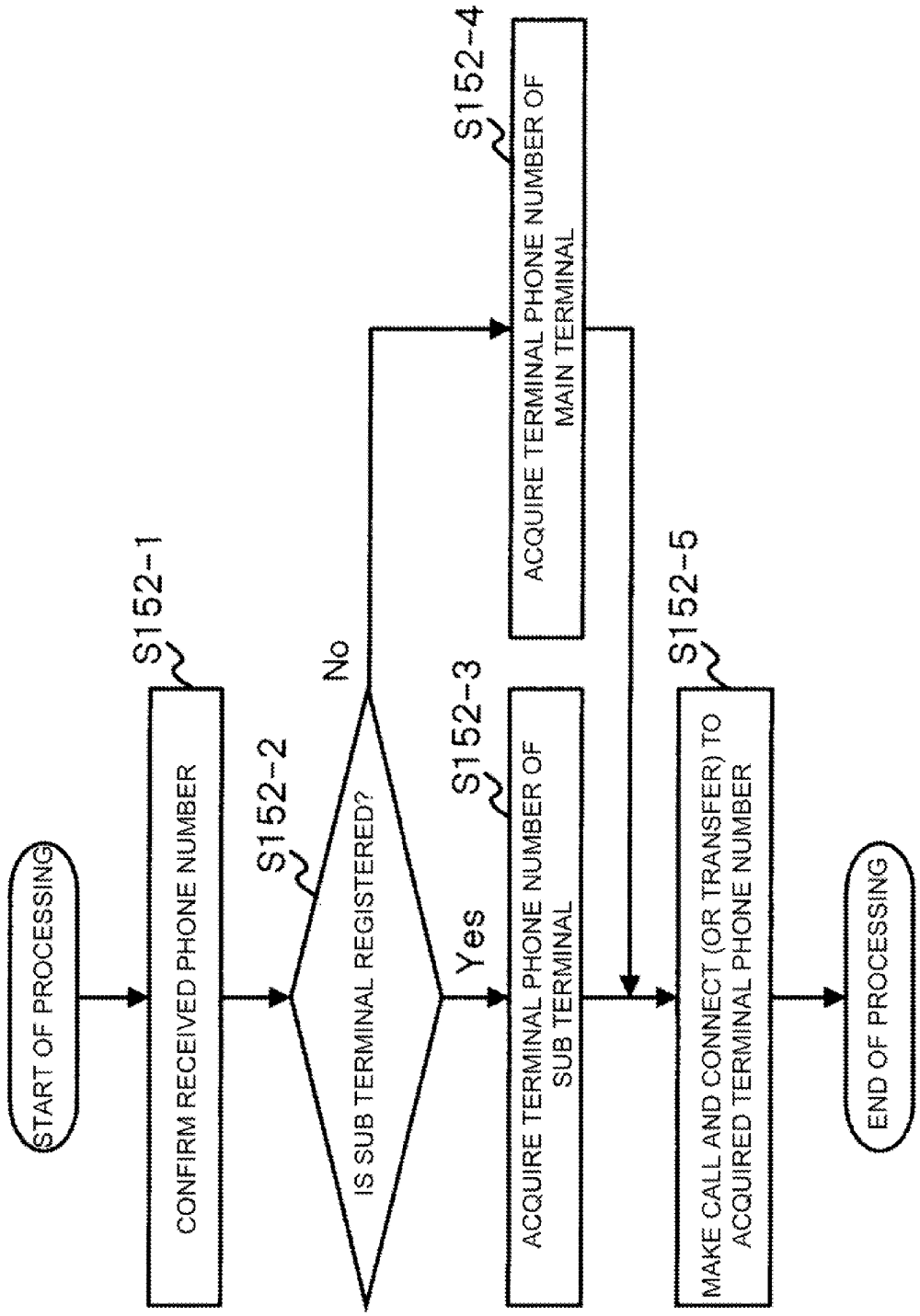
FIG. 9 is a flowchart showing an operation of call reception processing in the first exemplary embodiment.

The following describes the detailed operation of the call reception connection processing of the call control unit 150 with reference to FIG. 9. FIG. 9 is a flowchart showing an operation of the call reception processing in the first exemplary embodiment.

When the call reception connection processing is started, the call control unit 150 first confirms the phone number at which the call arrives (step S152-1 in FIG. 9).

Next, the call control unit 150 references the user terminal information via the using terminal judgment unit 140 and acquires an entry whose proxy number is the phone number at which the call arrived. And, the call control unit 150 confirms if the information on a sub terminal is set (step S152-2 in FIG. 9).

If a sub terminal is registered here (Yes in step S152-2), the call control unit 150 acquires the terminal phone number of the sub terminal (S152-3 in FIG. 9).

For example, when a call addressed to "050111111" arrives from the phone terminal 200, the call control unit 150 requests the using terminal judgment unit 140 to reference the user terminal information on "050111111."

The using terminal judgment unit 140 references the user terminal information, confirms an entry whose proxy number is "050111111" that is given, and notifies the call control unit 150 that a sub terminal is registered. The call control unit 150 confirms the sub terminal phone number and knows that the phone number is "090222222."

In this case, if a sub terminal is not registered (No in step S152-2), the call control unit 150 acquires the terminal phone number of the main terminal (S152-4 in FIG. 9).

For example, when a call addressed to "050111112" arrives from the phone terminal 200, the call control unit 150 requests the using terminal judgment unit 140 to reference the user terminal information on "050111112." The using terminal judgment unit 140 references the user terminal information, confirms an entry whose proxy number is "050111112" that is given, and notifies the call control unit 150 that a sub terminal is not registered. Upon receiving this notification, the call control unit 150 confirms the main terminal, phone number and knows that main terminal phone number is "090111112."

When the terminal phone number for the proxy number is acquired in this way, the call control unit 150 instructs the call relay unit 120 to make a call to the terminal phone number, to connect this call with the call that first arrived at the call relay unit 120, and to exchange sound information between the two calls so that the call can be carried out (step S152-5 in FIG. 9).

In response to this instruction, the call relay unit 120 makes a call to the user phone terminal 250-1 or 250-2 having the specified terminal phone number and, when the call is connected, exchanges the sound information with the call from the phone terminal 200 so that a voice call can be carried out between the user phone terminal 250-1 or 250-2 and the phone terminal 200 (step S153 in FIG. 8).

According to the example described above, when a call addressed to "050111111" arrives from the phone terminal 200, the call relay unit 120 is instructed by the call control unit 150 to establish a call with the terminal phone number "090222222."

Therefore, the call relay unit 120 makes a call to "090222222" and, if the call is established, exchanges the sound information with the call addressed to "050111111" to allow a call to be carried out between the phone terminal 200, which made a call to "050111111," and the user phone terminal 250-1 or 250-2 having the phone number "090222222."

When a call arrives from the phone terminal 200 to "050111112," the call relay unit 120 is instructed by the call control unit 150 to establish a call with the terminal phone number "090111112."

Therefore, the call relay unit 120 makes a call to "090111112" and, if the call is established, exchanges the sound information with the call addressed to "050111112" to allow a voice call to be carried out between the phone terminal 200, which made a call to "050111112" and the user phone terminal 250-1 or 250-2 having the phone number "090111112."

The processing of the call relay unit 120 may be implemented by another method, that is, by the so-called transfer of a call. For example, the call to "050111111" may be transferred to "090222222," which was given by the call control unit 150, to control the processing so that the call is connected directly between the phone terminal 200, which made a call to "050111111," and the user phone terminal having the phone number "090222222."

The instruction from the call control unit 150 in step S152-5 in FIG. 9 is an instruction requesting that a call be carried out between the phone terminal 200 that made a call in step S151 in FIG. 8 and the user phone terminal 250-1 or 250-2 having the terminal phone number acquired by the processing in FIG. 9. This processing may be performed by any method other than that described above.

In the first exemplary embodiment described above, a return call is made to the sub terminal if the sub terminal is registered, and to the main terminal if not With priority given to call reception by a sub terminal than call reception by a main terminal, this exemplary embodiment eliminates the need to set the selection of a reception terminal in an application scene where the user must use a terminal temporarily.

Second Exemplary Embodiment

Next, the second exemplary embodiment will be described below. The second exemplary embodiment is a first option of the first exemplary embodiment.

When the user uses this system, it is possible that a call relay server 100 receives a notification from a user phone terminal 250-1 or 250-2 indicating that the user is going to start the operation in the system.

A typical example is user authentication performed when the user starts the operation in system. Another example is a notification issued when the user starts or selects an application program that is installed in the phone terminal as one application program for implementing the function of this system.

It is possible that, when this operation start notification is received, the processing is performed according to the registration state of the user phone terminal 250-1 or 250-2, which is used, in the system.

Figure 10:
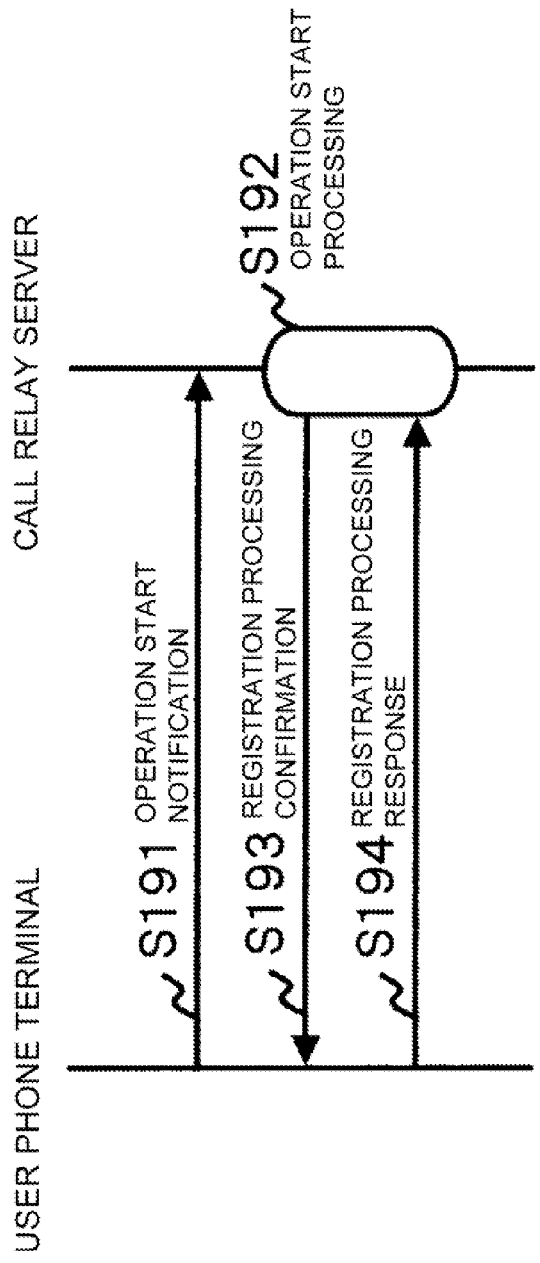
FIG. 10 is a sequence chart showing an operation of call processing in the second exemplary embodiment.
Figure 11:
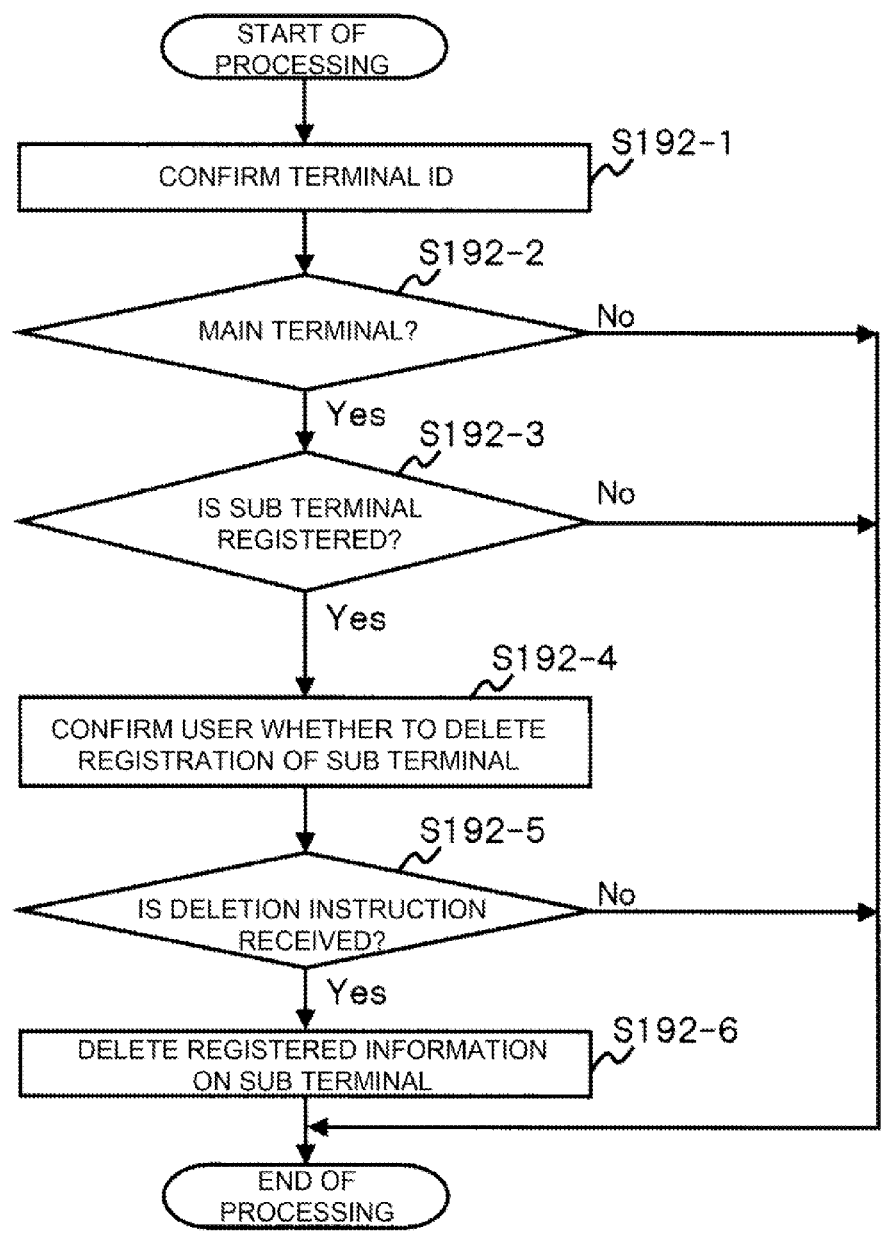
FIG. 11 is a flowchart showing an operation of call processing in the second exemplary embodiment.

The following describes an example of the processing with reference to FIG. 10 and FIG. 11. FIG. 10 is a sequence chart showing call processing in the second exemplary embodiment, and FIG. 11 is a flowchart showing the processing.

When the user operates the user phone terminal 250-1 or 250-2 to start using the system, the operation start notification is transmitted from the user phone terminal 250-1 or 250-2 to the call relay server (step S191 in FIG. 10).

At this time, the information on the terminal ID of the user phone terminal 250-1 or 250-2 is also notified.

In response to this notification, a usage state management unit 130 receives the notification via a data communication unit 110 of the call relay server 100 and processes the received notification (step S192 in FIG. 10). The processing in FIG. 11 shows an example of the operation of the usage state management unit 130.

When the operation start notification is received, the usage state management unit 130 confirms the terminal ID of the user phone terminal 250-1 or 250-2 from which the notification was transmitted (step S192-1 in FIG. 11).

Next, the usage state management unit 130 passes the confirmed terminal ID to a using terminal judgment unit 140 to confirm if the terminal is a main terminal (step S192-2 in FIG. 11). For example, if the terminal ID is "aaa," it is confirmed from the user terminal information in FIG. 3 that the user phone terminal is a main terminal. If the terminal ID is "bbb," it is confirmed that the user phone terminal is a sub terminal.

If the user phone terminal is not a main terminal, the processing is terminated.

If the user phone terminal is a main terminal, the usage state management unit 130 confirms if the information on the sub terminal is registered in the entry that contains the specified terminal ID as the main terminal (step S192-3 in FIG. 11).

According to the example of the user terminal information in FIG. 3, when the user phone terminal whose terminal ID is "aaa" transmits an operation start notification, it is judged that the information on the sub terminal is registered because the sub terminal ID and the sub terminal phone number are registered.

When the user phone terminal whose terminal ID is "ccc" transmits an operation start notification, it is judged that the information on the sub terminal is not registered because the sub terminal ID and the sub terminal phone number are not registered.

In this case, if the information on the sub terminal is not registered, the processing is terminated.

If the information on the sub terminal is registered, the usage state management unit 130 confirms the user, via the data communication unit 110, whether to delete the registration of the sub terminal (step S192-4 in FIG. 11 and step S193 in FIG. 10).

In this case, the user phone terminal 250-1 or 250-2 displays the registration deletion confirmation screen on the display of the terminal to prompt the user to confirm whether to delete the registration.

When the user responds to this screen on the user phone terminal 250-1 or 250-2, the user phone terminal 250-1 or 250-2 transmits the confirmed contents (step S194 in FIG. 10).

The usage state management unit 130 acquires the result via the data communication unit 110 and confirms the acquired result (step S192-5 in FIG. 11).

If the acquired result is not a deletion instruction, the processing is terminated.

If the acquired result is a deletion instruction, the registered information on the sub terminal is deleted (step S192-6) and the processing is terminated.

When the operation start notification is transmitted, the phone number of the user phone terminal 250-1 or 250-2 may also be specified in place of the terminal ID. In that case, the user terminal information is confirmed, not by the terminal ID, but by the terminal phone number.

In addition, when the operation start notification is transmitted, it is possible that the terminal ID, as well as the user identification information such as the proxy number, is transmitted and, when the terminal is confirmed in step S192-2 in FIG. 11, the judgment is made if the terminal is the main terminal or sub terminal corresponding to the proxy number or is some other terminal. In that case, if the terminal is not a terminal corresponding to the proxy number, it is possible that the user is rejected to use the system.

As described above, the second exemplary embodiment manages distinctively two types of terminal, the main terminal that is used regularly and the sub terminal that is used temporarily, so that, when the sub terminal is registered but the main terminal is used, the user may confirm if the registration of the sub terminal is already deleted, thus preventing the user from failing to delete the registration of the sub terminal.

Third Exemplary Embodiment

Next, the third exemplary embodiment will be described below. The third exemplary embodiment is a second option of the first exemplary embodiment.

Figure 12:
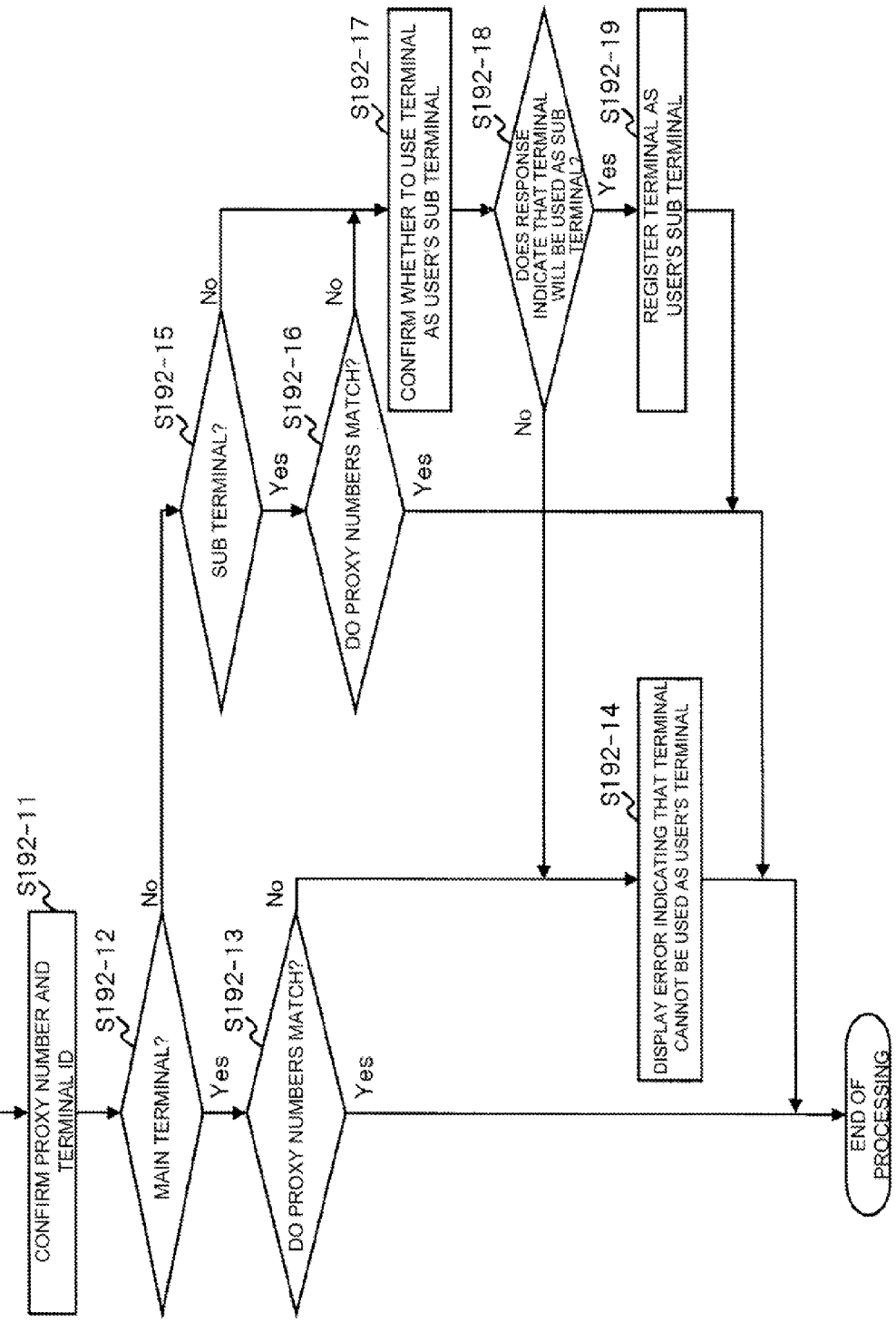
FIG. 12 is a flowchart showing an operation of call processing in a third exemplary embodiment.

The third exemplary embodiment will be described using another example, with reference to FIG. 10 and FIG. 12, in which, when an operation start notification is received, the processing is performed according to the registration state of a user phone terminal 250-1 or 250-2, which is used, in the system. FIG. 12 is a flowchart showing an operation of the call processing in the third exemplary embodiment.

When the user operates the user phone terminal 250-1 or 250-2 to start using the system, the operation start notification is transmitted from the user phone terminal 250-1 or 250-2 to a call relay server 100 (step S191 in FIG. 10).

At this time, the terminal ID of the user phone terminal 250-1 or 250-2 and the information identifying the user, such as the proxy number, are also notified.

In response to this notification, a usage state management unit 130 receives the notification via a data communication unit 110 of the call relay server 100 and processes the received notification (step S192 in FIG. 10). The processing in FIG. 12 shows an example of the operation of the usage state management unit 130.

When the operation start notification is received, the usage state management unit 130 receives the terminal ID of the user phone terminal 250-1 or 250-2, from which the notification was transmitted, and the proxy number identifying the user (step S192-11 in FIG. 12).

Next, via the using terminal judgment unit 140, the usage state management unit 130 confirms if the terminal ID is registered as a main terminal (step S192-12 in FIG. 12). If the terminal ID is not registered as a main terminal, the usage state management unit 130 also confirms if the terminal ID is registered as a sub terminal (step S192-15 in FIG. 12).

If the judgment result indicates that the terminal ID is registered as a main terminal, the usage state management unit 130 confirms if the proxy number in the registered entry matches the proxy number confirmed in step S192-11 in FIG. 12 (step S192-13 in FIG. 12).

If the proxy numbers match, the processing is terminated. If the proxy numbers do not match, an error display instruction is transmitted to the user phone terminal 250-1 or 250-2 (step S192-14 in FIG. 12 and step S193 in FIG. 10).

An example of the display is a message indicating that the terminal cannot be used as a user's terminal. In this case, the user phone terminal 250-1 or 250-2 displays an error message on the terminal screen to notify the user of the error but may or may not return its response (step S194 in FIG. 10).

On the other hand, if it is confirmed that the terminal ID is registered as a sub terminal, the usage state management unit 130 confirms if the proxy number in the registered entry matches the proxy number confirmed in step S192-11 in FIG. 12 (step S192-16 in FIG. 12). If those proxy numbers match, the processing is terminated immediately.

If the terminal ID is not registered as a sub terminal or if the terminal ID is registered as a sub terminal but the proxy numbers do not match, a confirmation instruction is transmitted to the user phone terminal 250-1 or 250-2 to confirm if the user phone terminal 250-1 or 250-2 will be used as a user's sub terminal (step S192-17 in FIG. 12 and step S193 in FIG. 10).

The user phone terminal 250-1 or 250-2, which receives this instruction, displays the confirmation information on the terminal screen and accepts a response from the user. The result selected by the user, which indicates whether or not the terminal will be used as a sub terminal, is notified to the usage state management unit 130 via the data communication unit 110 (step S194 in FIG. 10).

The usage state management unit 130 confirms the response from the user (step S192-18 in FIG. 12) and, if the response indicates that the terminal will be used as a sub terminal, registers the terminal as a user's sub terminal (step S192-19 in FIG. 12).

At this time, if a sub terminal is already registered, the existing registration may be overwritten or, if there is no entry for the user, a new entry may be created. At this time, the terminal may be registered as a user's main terminal or as a sub terminal.

In step S192-17 in FIG. 12, it is possible that the user's management information is referenced before the confirmation instruction is transmitted and that, if there is no proxy number, an error is displayed or the user is requested to confirm if a new entry is created.

If the result in step S192-18 in FIG. 12 is a response indicating that the terminal will not be used as a user's sub terminal, the usage state management unit 130 passes control to step S192-14 in FIG. 12 and prompts the user phone terminal to display the error. It is also possible not to display the error.

As described above, when an operation start notification is received from a terminal which is not registered as a user's terminal, the third exemplary embodiment allows the terminal to be registered as a sub terminal, making it possible to use the terminal temporarily.

Fourth Exemplary Embodiment

Next, a fourth exemplary embodiment will be described below. The fourth exemplary embodiment is a combination of the first option and the second option of the first exemplary embodiment.

As the operation of the usage state management unit 130 that is performed when an operation start notification is received from the user phone terminal 250-1 or 250-2, FIG. 11 shows the operation in which, when a sub terminal is registered but the notification is received from a main terminal, the user is requested to confirm whether to delete the sub terminal and FIG. 12 shows the operation in which, when the terminal is not registered, the user is requested to confirm if the terminal is to be registered.

Figure 13:
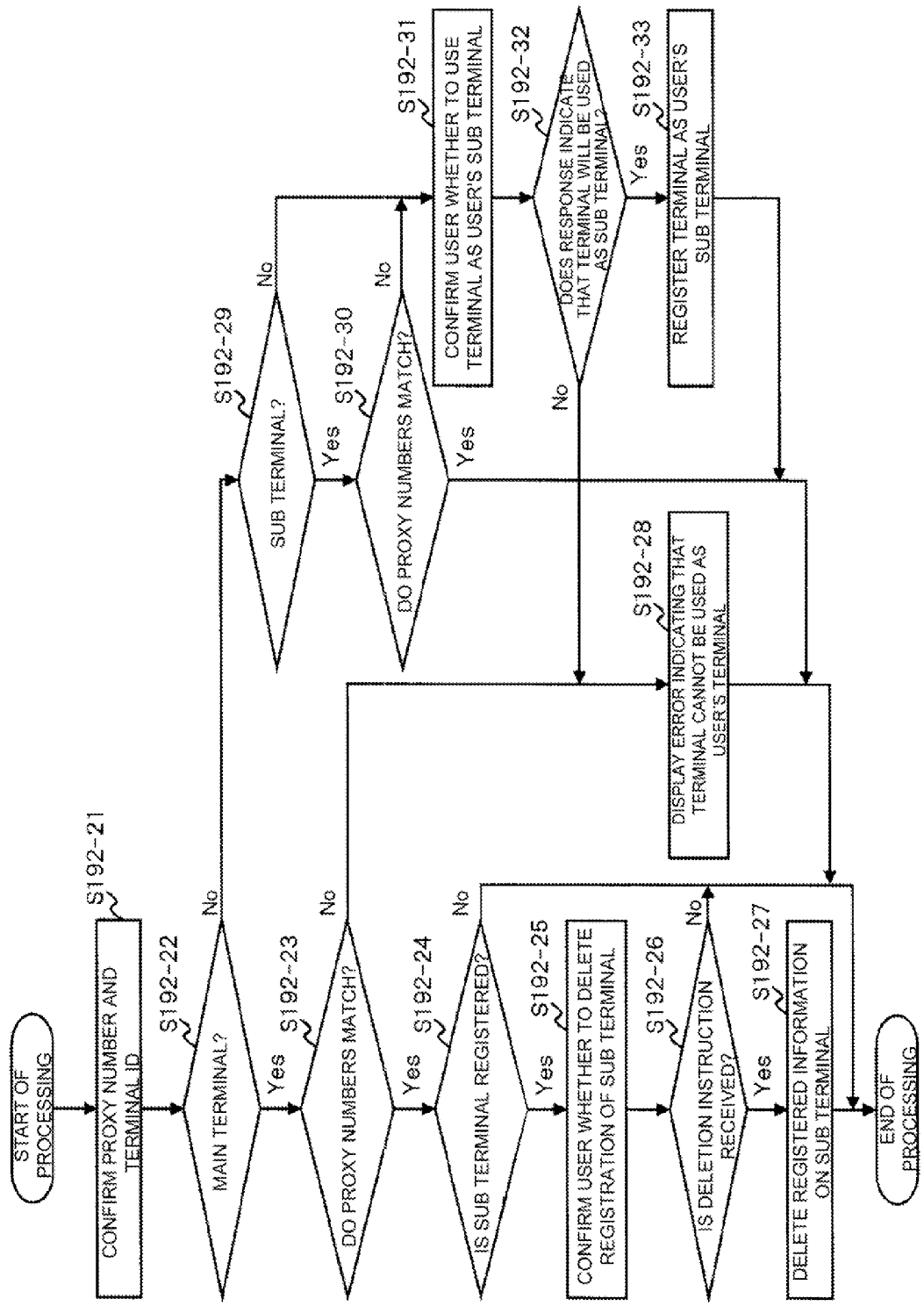
FIG. 13 is a flowchart showing an operation of call processing in a fourth exemplary embodiment.

It is possible to perform the operation in which the operations described above are combined. An example of an operation sequence is shown in FIG. 13. FIG. 13 is a flowchart showing an operation of the call processing in the fourth exemplary embodiment.

Because the operation is a combination of the operation in FIG. 11 and the operation of FIG. 12, the detailed description is omitted here.

In the fourth exemplary embodiment, when the sub terminal is registered but a notification is received from the main terminal, the user can confirm, as described above, whether to delete the sub terminal and, if the terminal is not registered, whether to register the terminal.

Fifth Exemplary Embodiment

Next, a fifth exemplary embodiment will be described below. The fifth exemplary embodiment is a modification of the data storage method in the first exemplary embodiment.

FIG. 14 shows another example of user terminal information. FIG. 14 is a diagram showing an example of user terminal information in the fifth exemplary embodiment.

In this example, a user ID is added as the user identification information. This user ID may be used as user identification information in place of a proxy number, for example, during the operation of the usage state management unit 130 in FIG. 12 and FIG. 13.

In this case, one way to use this user terminal information is to transmit the terminal ID and the user ID when an operation start notification is transmitted in step S191 in FIG. 10.

FIG. 15 and FIG. 16 show still other examples of user terminal information. FIG. 15 is a diagram showing an example of user terminal information in the fifth exemplary embodiment, and FIG. 16 is a diagram showing an example of phone terminal information in the fifth exemplary embodiment.

As shown in those examples, the user terminal information (FIG. 15) has only three types of information, proxy number, main terminal ID, and sub terminal ID, and the phone number of a user phone terminal 250-1 or 250-2 corresponding to a terminal ID is stored as the phone terminal information as shown in FIG. 16.

In this case, to identify a proxy number from the phone number of the user phone terminal 250-1 or 250-2, the terminal ID is identified first from the phone terminal information and then the user terminal information is referenced.

As a modification of user terminal information in FIG. 15, the example shown in FIG. 17 is possible in which the user ID is added as in FIG. 14. FIG. 17 is a diagram showing another example of user terminal information in the fifth exemplary embodiment.

As described above, the fifth exemplary embodiment provides the data storage method different from that in the first exemplary embodiment.

Sixth Exemplary Embodiment

Next, a sixth exemplary embodiment will be described below. The sixth exemplary embodiment is a modification of the first exemplary embodiment.

Figure 18:
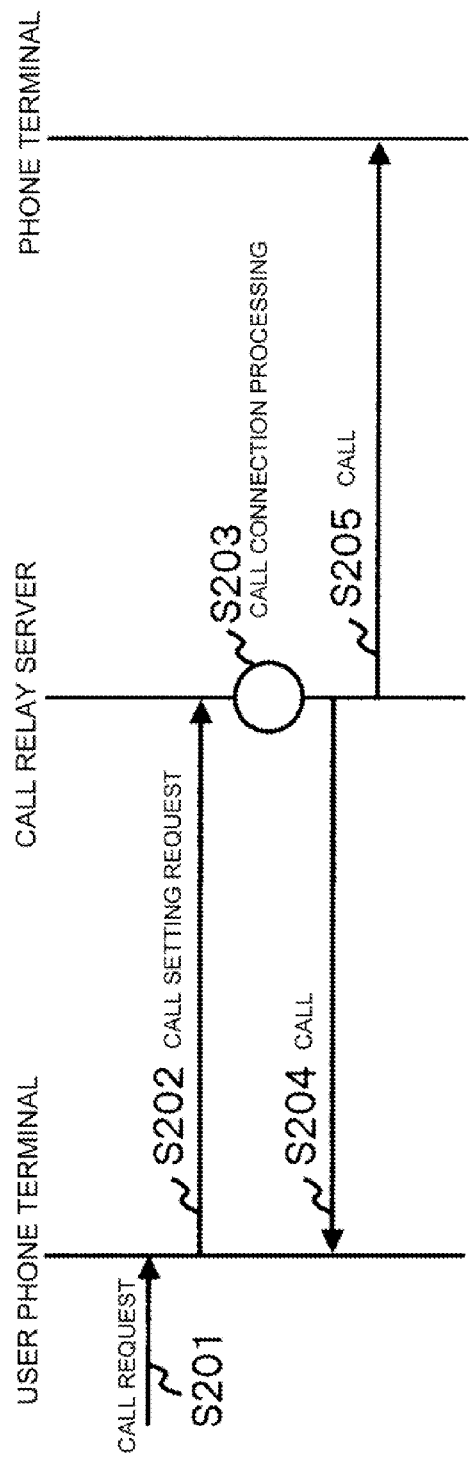
FIG. 18 is a sequence chart showing an operation of call processing in a sixth exemplary embodiment.

FIG. 18 and FIG. 19 show another mode of the call processing shown in FIG. 5, FIG. 6, and FIG. 7 in which the first exemplary embodiment is shown. FIG. 18 is a sequence chart showing an operation of the call processing in the sixth exemplary embodiment, and FIG. 19 is a flowchart showing an operation of the call processing.

In those figures, the part of the processing from the call request processing (step S201) to the start of the call processing (step S203) in FIG. 18 is the same as the part from step S101 to the start of step S103 in FIG. 5. Similarly, the steps from the start of the processing in FIG. 19 to step S203-3 in which the corresponding terminal phone number is acquired from the terminal ID are the same as step S103-1 to step S103-3 in FIG. 6.

The different part is the processing after the requested phone number and the terminal phone number are identified. After the requested phone number and the terminal phone number are identified in steps to step S203-3 in FIG. 19, a call is made first from the call relay unit 120 to the terminal phone number in this example of operation (step S203-4 in FIG. 19).

When this call is established, a call is made next from the call relay unit 120 to the requested phone number using the proxy number identified in step S203-2 in FIG. 19 (step S203-5 in FIG. 19).

After both calls are established, the sound information is exchanged each other so that the call can be made (step S203-6).

Note that the operation from step S203-4 to step S203-6 is generally called the call control by third party (Third Party Call Control (3 pcc)) that is described in Non-Patent Document 1 and so on.

Although Non-Patent Document 1 does not describe that a particular proxy number is set for the requested phone number, the operation performed until the call is established may be any another operation described in Non-Patent Document 1.

In the sixth exemplary embodiment, the call relay unit 120 makes a call to the terminal phone number as described above. When this call is established, the call relay unit 120 makes a call to the requested phone number using the identified proxy number and, after both calls are established, the sound information is exchanged each other so that the call can be made.

Seventh Exemplary Embodiment

Next, a seventh exemplary embodiment will be described below. The seventh exemplary embodiment relates to a program of the voice call relay method. Referring to FIG. 2, a call relay server 100 includes a main control unit 170 and a recording medium 180 as described above.

The recording medium 180 stores a program whose sequence charts and flowcharts are shown in FIGS. 5-13 and FIG. 18.

The main control unit 170 reads the program from the recording medium 180 to control a data communication unit 110, call relay unit 120, usage state management unit 130, using terminal judgment unit 140, call control unit 150, and call control information storage unit 160 according to the program.

The contents of the control have already been described and so the description is omitted here.

As described above, the seventh exemplary embodiment provides the program that performs return call reception for a sub terminal if the sub terminal is registered, and performs return call reception for a main terminal if the sub terminal is not registered.

The contents disclosed in Patent Documents given above are hereby incorporated herein by reference thereto in their entirety. In the framework of entire disclosure of the present invention (including the claims), and based on its basic technological idea, exemplary embodiments or examples of the present invention may be changed and/or modified. Also it should be noted that in the scope of the claims of the present invention, any combinations or selections of various elements disclosed herein are possible. That is, needless to say, it is understood by those skilled in the art that various changes or modifications can be made to the present invention based on the disclosure of the present invention including the claims and the technological idea of the present invention.

What is claimed is:

1. A call relay server comprising:
a usage status management unit that, when a user starts using a system from a main terminal and a notification of starting is received from the main terminal and if a sub terminal related to the main terminal is registered, confirms the user via the main terminal whether to delete a registration of the sub terminal and, if a deletion instruction is received, deletes the registration of the sub terminal;
a call control information storage unit that stores, for each user, a proxy phone number and terminal identification information on said main terminal and said sub terminal; and
a call control unit that, when a call start request is received from a terminal, judges if the terminal is said main terminal or said sub terminal based on terminal identification information on a request source, establishes a call with said main terminal or said sub terminal and then makes a call to a call destination using the proxy phone number of the user, and forwards an incoming call, addressed to the proxy phone number, to said sub terminal if terminal identification information on said sub terminal is stored but, otherwise, forwards the incoming call to said main terminal.

2. The call relay server as defined by claim 1, wherein, when the user starts using the system from said main terminal or said sub terminal, said usage state management unit receives a notification of starting along with a proxy phone number from said main terminal or said sub terminal and, if said main terminal or said sub terminal is not registered as a phone terminal of the proxy phone number, confirms the user via said main terminal or said sub terminal whether said main terminal or said sub terminal will be used as a sub terminal of the proxy phone number; and if a request to use the terminal as a sub terminal is received, registers the terminal as a sub terminal.

3. A voice call relay method comprising:
when a user starts using a system from a main terminal, receiving by a call relay server a notification of starting from said main terminal;
if a sub terminal related to said main terminal is registered, confirming by said call relay server the user via said main terminal whether to delete the registration of said sub terminal; and
if a deletion instruction is received, deleting by said call relay server a registration of said sub terminal;
storing, for each user, a proxy phone number and terminal identification information on said main terminal and said sub terminal;
when a call start request is received from a terminal, judging if the terminal is said main terminal or said sub terminal based on terminal identification information on a request source, establishing a call with said main terminal or said sub terminal and then making a call to a call destination using the proxy phone number of the user; and
forwarding an incoming call, addressed to the proxy phone number, to said sub terminal if terminal identification information on said sub terminal is stored but, otherwise, forwarding the incoming call to said main terminal.

4. The voice call relay method as defined by claim 3, further comprising:
when the user starts using the system from said main terminal or said sub terminal, receiving by said call relay server a notification of starting along with a proxy phone number from said main terminal or said sub terminal;
if said main terminal or said sub terminal is not registered as a phone terminal of the proxy phone number, confirming by said call relay server the user, via said main terminal or said sub terminal, whether said main terminal or said sub terminal will be used as a sub terminal of the proxy phone number; and
if a request to use the terminal as a sub terminal is received, registering by said call relay server the terminal as a sub terminal.

5. The call relay server as defined by claim 1, further comprising a call control information storage unit that stores, for each user, a proxy phone number and terminal identification information on a main terminal and a sub terminal, wherein said usage state management unit references said call control information storage unit to judge whether the sub terminal related to the main terminal is registered or not.

6. A voice call system comprising:

a plurality of phone terminals; and the phone relay server as defined by claim 1, said phone relay server relaying a call among said plurality of phone terminals.

7. The voice call relay method as defined by claim 3, further comprising:

storing by said call relay server, for each user, a proxy phone number and terminal identification information on a main terminal and a sub terminal as user terminal information; and referencing by said call relay server the user terminal information to judge whether the sub terminal related to the main terminal is registered or not.

8. A non-transitory computer-readable storage medium storing a program that causes a computer to perform processing of a voice relay method, the method comprising:

when a user starts using a system from a main terminal, receiving by a call relay server a notification of starting from said main terminal;

if a sub terminal related to said main terminal is registered, confirming by said call relay server the user via said main terminal whether to delete the registration of said sub terminal; and if a deletion instruction is received, deleting by said call relay server a registration of said sub terminal;

storing, for each user, a proxy phone number and terminal identification information on said main terminal and said sub terminal;

when a call start request is received from a terminal, judging if the terminal is said main terminal or said sub terminal based on terminal identification information on a request source, establishing a call with said main terminal or said sub terminal and then making a call to a call destination using the proxy phone number of the user; and forwarding an incoming call, addressed to the proxy phone number, to said sub terminal if terminal identification information on said sub terminal is stored but, otherwise, forwarding the incoming call to said main terminal.

* * * * *